March 28, 1950     E. S. HINELINE     2,502,402
REMOVABLY MOUNTED CAMERA LENS CONE
Original Filed Aug. 10, 1946     2 Sheets-Sheet 1
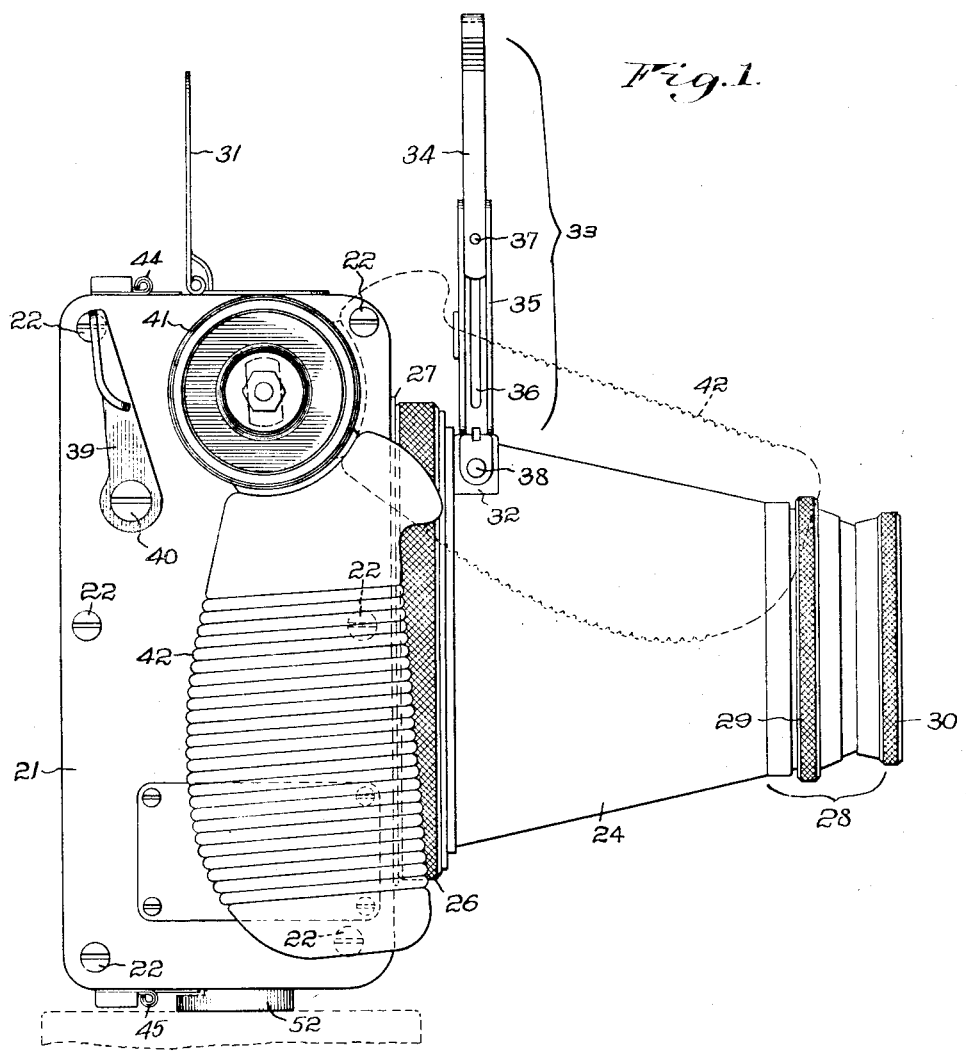
INVENTOR.
Edson S. Hineline
BY
his Attorneys March 28, 1950      E. S. HINELINE      2,502,402
REMOVABLY MOUNTED CAMERA LENS CONE
Original Filed Aug. 10, 1946      2 Sheets-Sheet 2
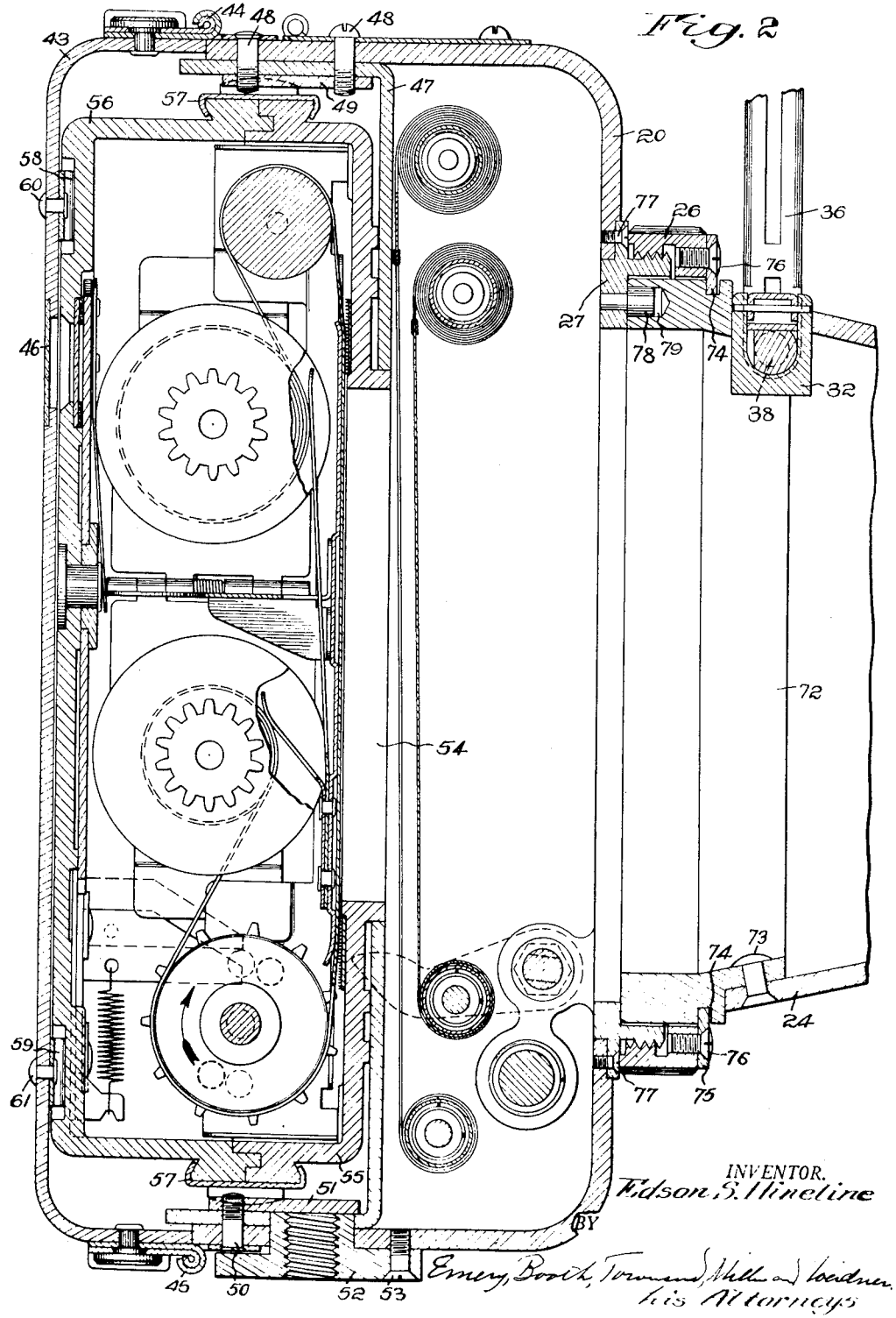

Patented Mar. 28, 1950

2,502,402

UNITED STATES PATENT OFFICE 2,502,402

REMOVABLY MOUNTED CAMERA LENS CONE

Edson S. Hineline, Rochester, N. Y., assignor to Graflex, Inc., Rochester, N. Y., a corporation of Delaware Original application August 10, 1946, Serial No. 689,714. Divided and this application July 24, 1947, Serial No. 763,237

1 Claim. (Cl. 88—57)

This application is a division of my co-pending application Ser. No. 689,714, filed August 10, 1946.

The invention relates to removably mounted lens cones of hand-held cameras.

In order that the principle of the invention may be readily understood, I have disclosed a single embodiment thereof in the accompanying drawings wherein—

Fig. 1 is a right-hand side elevation of a hand-held camera provided with a removable lens cone showing the view finder on the cone in erected position for making an exposure; and Fig. 2 is a vertical section through Fig. 1, showing the construction of the cone mounting ring, the upper part of the view finder being broken away and the internal construction of the camera being shown, but not herein claimed.

The camera is provided with a removable lens cone for the ready interchange of lenses. One element of the view finder (not herein claimed) is carried by the lens cone, and, since the proportions of that element of the view finder can be changed to indicate the field covered by the particular lens carried in that cone, the act of changing cones also provides the proper view finder element for use with that lens and cone.

Thus, in accordance with my invention, the camera has interchangeable lens cones, each cone being provided with a lens of a certain focal length, such cone carrying a corresponding element of the view finder that will indicate the field being covered by the particular lens used.

Referring more particularly to the drawings, the camera body indicated at 20 is substantially rectangular in cross section, and to it is attached a right side cover plate 21 housing the film feed mechanism, which is held to the camera body 20 by screws 22, 22, Fig. 1. To the front of the camera body 20 a lens cone 24 is attached by means of a lock ring 26 threaded onto a flange 27, and securely holding the cone 24 to the camera body 20. On the right-hand end of the cone 24, viewing Fig. 1, is a lens mount 28 having the usual focusing ring 29 and a diaphragm control ring 30.

Also attached to the camera body 20, as indicated at 31, is one element of the sight or view finder, not herein claimed. To the cone 24, and specifically to bosses 32 carried by the cone, is attached the front element of the sight or view finder, generally indicated at 33, made up of an upper inverted U-shaped member 34 and two lower upright telescopic members 35, one only being shown. The said telescopic members 35 are each provided with an elongated slot 36, in which slides a shoulder rivet 37 projecting from the downwardly extending side members of the inverted U-shaped member 34. The lower end of each telescopic member 35 is pivoted on a pin 38 fitted into the boss 32 of the lens cone 24. The said inverted U-shaped member 34 of the sight or view finder can be collapsed into the telescopic members 35 and the entire sight or view finder can be folded down onto the lens cone 24 for compactness and portability.

Attached to the cover plate 21 is a shutter release member 39 that is pivoted on a shaft passing through the wall of the cover plate 21 and held thereto by a screw 40. Also attached to the cover plate 21 is a shutter setting knob 41 fitted to a shaft passing through a suitable bearing in the cover plate 21, and carrying an operating handle 42.

Fitted to the back of the camera is a back member or door, indicated at 43, provided with an upper hinge member 44 and a lower hinge member 45, shown in Figs. 1 and 2. The hinge members used hereon are of the type that permit the door to be pivoted on either hinge member 44 or 45, or the door may be entirely removed. The structure is fully shown in the United States patent to Whitman and Nadel, No. 2,273,455, dated February 17, 1942, and needs no further description here. The camera back is provided with a window 46 for viewing the exposure number.

Fig. 2, being a vertical cross section through the camera, most clearly shows the position of the magazine and also the curtain rollers, not herein described in detail and not claimed. There is provided a vertical partition in the camera, indicated at 47, having the upper end bent over to the left, through which pass screws 48, 48, and these in turn are threaded into a retaining member 49. The lower end of the partition plate or member 47 is also provided with a left-hand extending member, through which passes a screw 50 into a retainer plate 51. The screws 48 and 50 also serve to hold to the camera body the hinge members 44 and 45, respectively.

Also attached to the bottom side of the camera body 20 is a tripod socket flange member 52 by means of screws 53, 53. The partition plate or member 47 is provided with an opening, into which a projecting member 54 of the magazine lower casting 55 is fitted. The magazine is made up of two castings, namely, the lower or forward one 55 and the upper or rearward one 56. The said castings 55 and 56 are held together by spring clips 57, 57. The camera magazine made up of the castings 55, 56 is held in place in the camera by springs 58 and 59 held to the camera back 43 by rivets 60 and 61, respectively.

As shown in Fig. 2, the lens cone 24 is provided with a forwardly extending cylindrical member 72 held to the lens cone 24 by rivets 73, 73. The cylindrical member 72 is provided with a groove 74, into which is fitted a ring 75, itself attached to the cone locking nut 26 by screws 76, 76. The flange 27 is held to the camera body 20 by screws 77, 77, and is provided with a locking pin 78 engaging a hole 79 of the cylindrical cone member 72. The cone 24 is attached to the camera body 20 by the threaded clamp nut 26 that is threaded to the flange 27 and tightened in the usual manner. The right side cover plate 21 of the camera body constitutes a mechanism housing for the film rewind mechanism and also for the shutter speed setting and rewind mechanism, not herein disclosed or claimed.

Having thus described one illustrative embodiment of the invention, it is to be understood that although specific terms are employed, they are used in a generic and descriptive sense, and not for purposes of limitation, the scope of the invention being set forth in the following claim.

I claim:

A camera of the hand-carried type having a box-like body, the front wall whereof, which is vertical when the camera is held in proper position for taking a picture, is flush and has therein a circular opening, the thickness of said front wall being slightly annularly reduced at its outer face, so as to present an annular shoulder, a ring-like parallel-walled member of substantially the thickness of said front wall fitted into said circular opening, said ring-like member being of very short radius, and being provided with an outwardly projecting, externally threaded flange and also a thin radial flange that is received in the annular reduction surrounding said circular opening, and engages said shoulder, a removable tubular lens mount support having its inner edge terminating flush against the outer face of said ring-like member, and having mounted thereon a lens of a focal length corresponding and appropriate to such removable lens mount support, whereby any one of a series of different lens mount supports may be attached to said camera, each such support having its own lens of appropriate focal length, the said ring-like member having a forwardly-projecting pin, and the inner edge of the tubular lens mount support having a hole to receive said locking pin, an internally-threaded clamp nut threaded onto said forwardly-extending externally-threaded flange, the said tubular lens mount support having an annular recess upon its outer surface near its inner end, and the said threaded clamp nut having a ring secured to its outer annular edge, the inner edge of which ring is received in said annular recess.

EDSON S. HINELINE.

REFERENCES CITED

The following references are of record in the file of this patent:

UNITED STATES PATENTS

| Number | Name | Date |
|---|---|---|
| 624,693 | Sheffield | May 9, 1899 |
| 970,443 | Hammond | Sept. 13, 1910 |
| 1,612,860 | Fairchild | Jan. 4, 1927 |
| 1,863,573 | Lutz et al. | June 21, 1932 |
| 2,006,464 | Laube | July 2, 1935 |
| 2,052,261 | Verschoor | Aug. 25, 1936 |
| 2,117,231 | Trautmann | May 10, 1938 |
| 2,124,161 | Cooke et al. | July 19, 1938 |
| 2,136,149 | Nuchterlein | Nov. 8, 1938 |
| 2,282,263 | Steiner | May 5, 1942 |
| 2,287,468 | Cisski | June 23, 1942 |
| 2,390,932 | Fitz | Dec. 11, 1945 |
| 2,467,456 | Baer | Apr. 19, 1949 |

FOREIGN PATENTS

| Number | Country | Date |
|---|---|---|
| 562,086 | Germany | Oct. 21, 1932 |